United States Patent
Subramanian et al.

(10) Patent No.: US 11,050,474 B2
(45) Date of Patent: Jun. 29, 2021

(54) UPLINK BEAM TRAINING

(71) Applicant: QUALCOMM Incorporated, San Diego, CA (US)

(72) Inventors: Sundar Subramanian, San Diego, CA (US); Juergen Cezanne, Ocean Township, NJ (US); Bilal Sadiq, Basking Ridge, NJ (US); Muhammad Nazmul Islam, Littleton, MA (US); Navid Abedini, Somerset, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/783,746

(22) Filed: Feb. 6, 2020

(65) Prior Publication Data
US 2020/0220596 A1    Jul. 9, 2020

Related U.S. Application Data

(62) Division of application No. 16/133,205, filed on Sep. 17, 2018, now Pat. No. 10,700,748.

(Continued)

(51) Int. Cl.
*H04B 7/06* (2006.01)
*H04B 7/0408* (2017.01)
(Continued)

(52) U.S. Cl.
CPC ......... *H04B 7/0617* (2013.01); *H04B 7/0408* (2013.01); *H04B 7/063* (2013.01);
(Continued)

(58) Field of Classification Search
CPC .... H04B 7/0617; H04B 7/088; H04B 7/0632; H04B 7/063; H04B 7/0634; H04B 7/0408;
(Continued)

(56) References Cited

U.S. PATENT DOCUMENTS

| 2014/0185481 | A1 | 7/2014 | Seol et al. |
| 2016/0087705 | A1 | 3/2016 | Guey et al. |

(Continued)

FOREIGN PATENT DOCUMENTS

| WO | WO-2015090041 A1 | 6/2015 |
| WO | WO-2018144844 A1 | 8/2018 |
| WO | WO-2018204340 A1 | 11/2018 |

OTHER PUBLICATIONS

International Search Report and Written Opinion—PCT/US2018/051734—ISA/EPO—dated Jan. 11, 2019.

(Continued)

*Primary Examiner* — Kabir A Timory
(74) *Attorney, Agent, or Firm* — Qualcomm IP Dept.; James Hunt Yancey, Jr.

(57) ABSTRACT

Wireless communication techniques that include beam training performed to aid mobile devices in identifying beams for use in communications (e.g., uplink communications) are discussed. A mobile device may transmit to a base station an indication of a level of beamforming reciprocity of the mobile device. A base station/gNB may transmit an indication of one or more transmission beams to be used by the mobile device for uplink wireless communication based on the level of beamforming reciprocity. The one or more transmission beams to be used by the mobile device for uplink communication may include a reciprocal transmission beam. A mobile device not capable of full beamforming reciprocity may determine a transmission beam through uplink beam training. A mobile device may transmit to a base station information using at least one of the one or more transmission beams. Other aspects and features are also claimed and discussed.

20 Claims, 7 Drawing Sheets

Related U.S. Application Data

(60) Provisional application No. 62/570,022, filed on Oct. 9, 2017.

(51) Int. Cl.
*H04W 72/04* (2009.01)
*H04W 16/28* (2009.01)
*H04B 7/08* (2006.01)
*H04L 5/00* (2006.01)

(52) U.S. Cl.
CPC ......... *H04B 7/0632* (2013.01); *H04B 7/0634* (2013.01); *H04B 7/0695* (2013.01); *H04B 7/088* (2013.01); *H04L 5/0023* (2013.01); *H04W 16/28* (2013.01); *H04W 72/046* (2013.01)

(58) Field of Classification Search
CPC ... H04B 7/0695; H04B 7/0628; H04L 5/0023; H04W 72/046; H04W 16/28; H04W 72/0413; H04W 72/042; H04W 72/048; H04W 72/08; H04W 72/1284; H04W 72/1289
See application file for complete search history.

(56) References Cited

U.S. PATENT DOCUMENTS

2018/0192375 A1* 7/2018 Xia .................. H04W 52/32
2019/0109625 A1 4/2019 Subramanian et al.

OTHER PUBLICATIONS

Mediatek Inc: "Discussion on UL Beam Management and Imperfect Beam Correspondence", 3GPP Draft, R1-1704455_UL_BM_Final, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Mar. 25, 2017 (Mar. 25, 2017), XP051251245, 5 Pages, Retrieved from the Internet: URL:http://www.3gpp.org/ftp/tsg_ran/WG1_RL1/TSGR1_88b/Docs/ [retrieved on Mar. 25, 2017].

Mediatek Inc: "Efficient UL Beam Management for Imperfect Beam Correspondence", 3GPP Draft, R1-1710809_UL_BM_Final, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 17, 2017 (Jun. 17, 2017), XP051305234, 4 Pages, Retrieved from the Internet: URL:http://www.3gpp.org/ftp/tsg_ran/WG1_RL1/TSGR1_AH/NR_AH_1706/Docs/ [retrieved on Jun. 17, 2017].

Vivo: "Discussion on Beam Management for NR MIMO," 3GPP Draft; R1-1700274_Discussion on Beam Management for NR MIMO, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017, XP051207812, 7 pages, Retrieved from the Internet: URL: http://www.3gpp.org/ftp/Meetings_3GPP_SYNC/RAN1/Docs/ [retrieved on Jan. 16, 2017].

Intel Corporation: "Control Signaling for UL Beam Management", R1-1702201, 3GPP TSG RAN WG1 #88, 3GPP Server release date (Feb. 7, 2017), 2 pages.

Intel Corporation: "On UL Beam Management", R1-1702203, 3GPP TSG RAN WG1 #88, 3GPP Server release date (Feb. 7, 2017), 4 pages.

Mediatek Inc., "Details on UL Beam Management", R1-1713696, 3GPP TSG RAN WG1 #90, 3GPP Server release date (Aug. 12, 2017), 4 pages.

Nokia et al., "Beam Management—Beam Reciprocity Impacts", 3GPP TSG-RAN WG1#87, R1-1612866, Reno, U.S.A., Nov. 14-18, 2016, 5 Pages.

NTT Docomo Inc: "Beam Correspondence Information (BCI) Acquisition Scheme", 3GPP TSG-RAN WG1 Meeting #87, R1-1612732, Reno, USA, Nov. 14-18, 2016, pp. 1-3.

QUALCOMM Incorporated: "Reciprocity vs Non-reciprocity in Initial Access/RACH", 3GPP TSG RAN WG1 #87, 3GPP Draft; R1-1612037, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 14, 2016-Nov. 18, 2016, Nov. 14-18, 2016 (Nov. 5, 2016), 10 Pages, XP051190270, Retrieved from the Internet: URL: http://www.3gpp.org/ftp/tsg_ran/WG1_RL1/TSGR1_87/Docs/ [retrieved on Nov. 5, 2016] the whole document.

* cited by examiner

UPLINK BEAM TRAINING

CROSS-REFERENCE TO RELATED APPLICATIONS

This application is a divisional application of U.S. patent application Ser. No. 16/133,205, entitled "UPLINK BEAM TRAINING," filed on Sep. 17, 2018, which claims the benefit of and priority to U.S. Provisional Patent Application No. 62/570,022, entitled "UPLINK BEAM TRAINING," filed on Oct. 9, 2017. Both of said applications are incorporated herein by reference as if fully set forth below in their entireties and for all applicable purposes.

TECHNICAL FIELD

Aspects of the present disclosure relate generally to wireless communication systems, and more particularly, to uplink beam training in wireless communication systems (e.g., to aid a mobile device in identifying beams for use in uplink wireless communication). Certain embodiments of the technology discussed below can enable and provide enhanced communication features and techniques for communication systems, including high data rates, high capacity, spectral efficiency, high reliability, and power-efficient device operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. For example, a method can include transmitting, by a processor of the wireless communication device, an indication of a level of beamforming reciprocity via one or more antennas of the wireless communication device. The method can also include receiving, by the processor, an indication of one or more transmission beams to use for uplink wireless communication via one or more antennas of the wireless communication device, the received indication of one or more transmission beams to use for uplink wireless communication being associated with the transmitted indication of the level of beamforming reciprocity. The method may further include transmitting, by the processor, information using at least one of the one or more transmission beams via one or more antennas of the wireless communication device.

In an additional aspect of the disclosure, an apparatus configured for wireless communication is provided. For example, the apparatus can include means for transmitting an indication of a level of beamforming reciprocity. The apparatus can also include means for receiving an indication of one or more transmission beams to use for uplink wireless communication, the received indication of one or more transmission beams to use for uplink wireless communication being associated with the transmitted indication of the level of beamforming reciprocity. The apparatus may further include means for transmitting information using at least one of the one or more transmission beams.

In an additional aspect of the disclosure, a non-transitory computer-readable medium having program code recorded thereon is provided. The program code can include program code for causing a computer to transmit an indication of a level of beamforming reciprocity. The program code can also include program code for causing a computer to receive an indication of one or more transmission beams to use for uplink wireless communication, the received indication of one or more transmission beams to use for uplink wireless communication being associated with the transmitted indication of the level of beamforming reciprocity. The program code may further include program code for causing a computer to transmit information using at least one of the one or more transmission beams.

In an additional aspect of the disclosure, an apparatus configured for wireless communication is provided. The apparatus includes at least one processor, and a memory coupled to the processor. The at least one processor can be configured to transmit an indication of a level of beamforming reciprocity. The at least one processor can also be configured to receive an indication of one or more transmission beams to use for uplink wireless communication, the received indication of one or more transmission beams to use for uplink wireless communication being associated with the transmitted indication of the level of beamforming reciprocity. The at least one processor may be further configured to transmit information using at least one of the one or more transmission beams.

In one aspect of the disclosure, a method of wireless communication is provided. For example, a method can include receiving, by a processor of the base station, an indication of a level of beamforming reciprocity associated with a mobile device via one or more antennas of the base station. The method can also include transmitting, by the processor via one or more antennas of the base station, an indication of one or more transmission beams to be used by the mobile device for uplink wireless communication based on the level of beamforming reciprocity. The method may further include receiving, by the processor via one or more antennas of the base station, information that has been transmitted using at least one of the one or more transmission beams.

In an additional aspect of the disclosure, an apparatus configured for wireless communication is provided. For example, the apparatus can include means for receiving an indication of a level of beamforming reciprocity associated with a mobile device. The apparatus can also include means for transmitting an indication of one or more transmission beams to be used by the mobile device for uplink wireless communication based on the level of beamforming reciprocity. The apparatus may further include means for receiving information that has been transmitted using at least one of the one or more transmission beams.

In an additional aspect of the disclosure, a non-transitory computer-readable medium having program code recorded thereon is provided. The program code can include program code for causing a computer to receive an indication of a level of beamforming reciprocity associated with a mobile device. The program code can also include program code for causing a computer to transmit an indication of one or more transmission beams to be used by the mobile device for uplink wireless communication based on the level of beamforming reciprocity. The program code may further include program code for causing a computer to receive information that has been transmitted using at least one of the one or more transmission beams.

In an additional aspect of the disclosure, an apparatus configured for wireless communication is provided. The apparatus includes at least one processor, and a memory coupled to the processor. The at least one processor can be configured to receive an indication of a level of beamforming reciprocity associated with a mobile device. The at least one processor can also be configured to transmit an indication of one or more transmission beams to be used by the mobile device for uplink wireless communication based on the level of beamforming reciprocity. The at least one processor may be further configured to receive information that has been transmitted using at least one of the one or more transmission beams.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
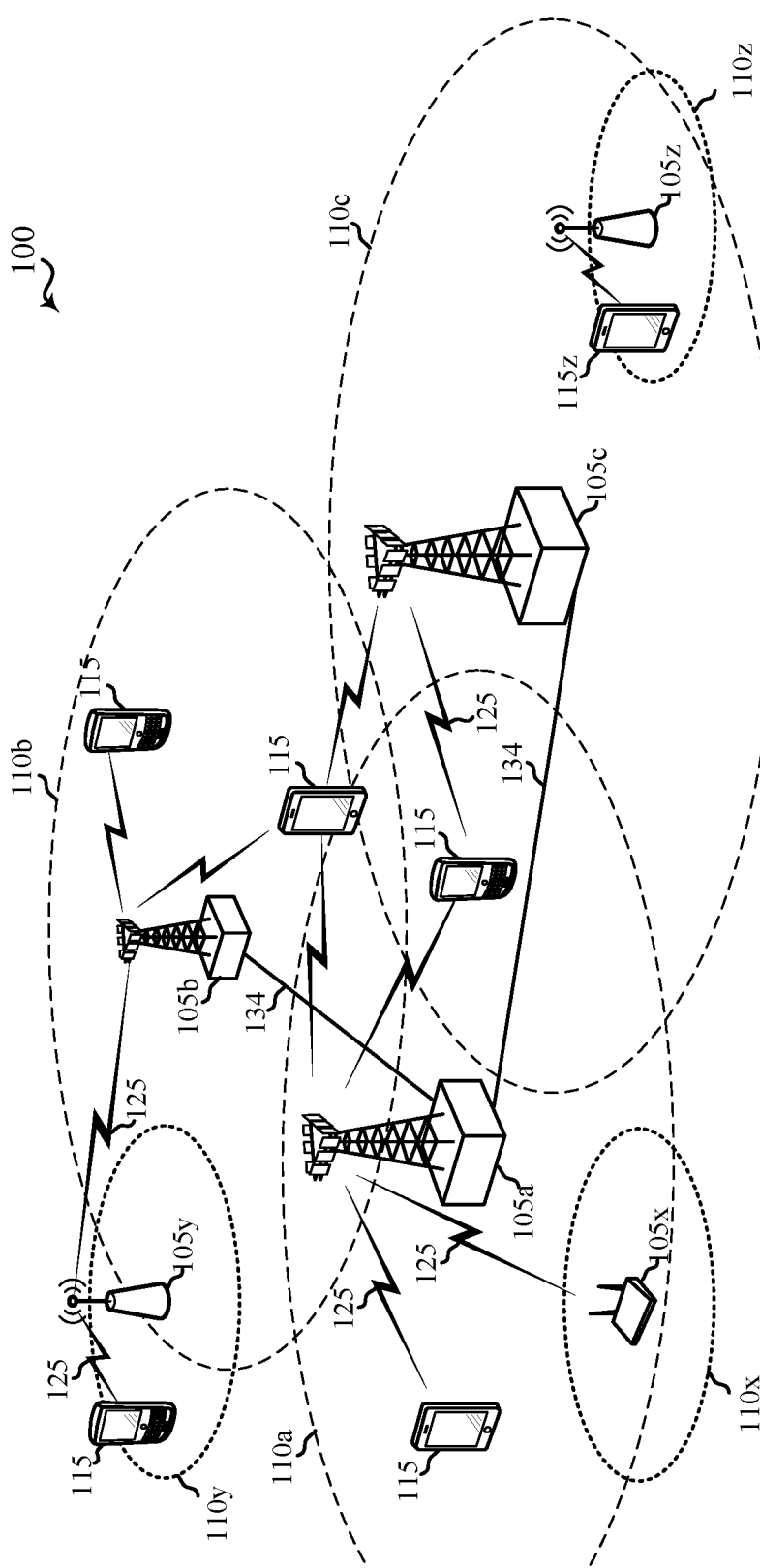
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary CIE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces. For example, next generation networks (e.g., 5G networks and beyond) are being designed to support features such as high bandwidth operations, as discussed in 3GPP Releases 14, 15, 16, 17, and forward.

While aspects and embodiments are described in this application, those skilled in the art will understand that implementations and use cases may come about in many different arrangements and scenarios. Innovations described herein may be implemented across many differing platform types, for example, via integrated chip embodiments and other non-module-component based devices (end-user devices, vehicles, communication devices, etc.). While some claims may or may not be specifically directed to particular use cases or applications, a wide assortment of applicability of the innovations may take place. Ranging from modular components to whole devices incorporating aspects of the described innovations.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
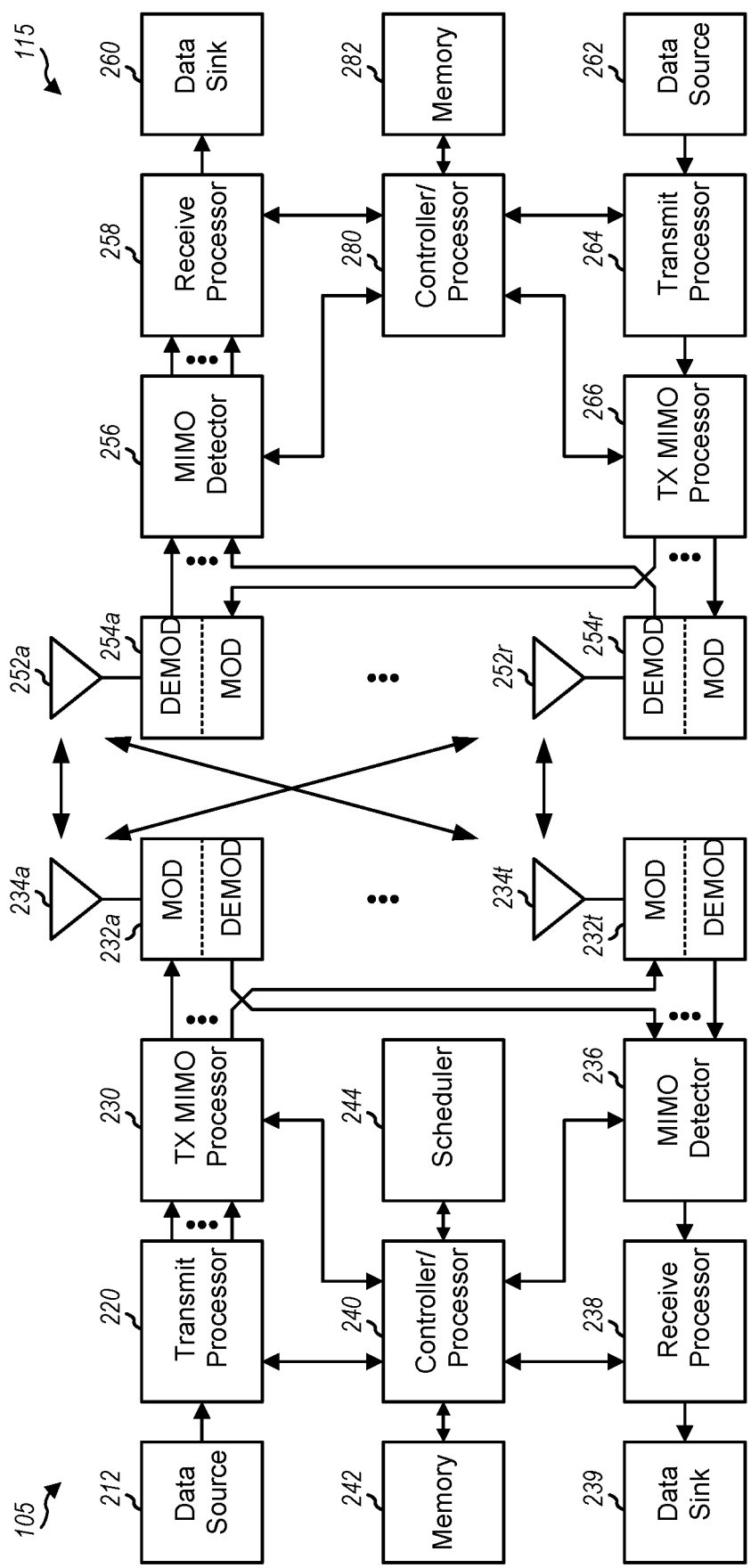
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein. Memories 242 and 282 may store data and program codes for gNB 105 and UE 115, respectively. Scheduler 244 may schedule UEs for data transmission on the downlink and/or uplink.

As illustrated in FIGS. 1-2, base stations and mobile devices may each be equipped with multiple antennas to transmit and/or receive information. In some embodiments, base stations and mobile devices may use the multiple antennas for beamforming. Beamforming may refer to the configuring of multiple antennas to form a beam through which information may more efficiently and/or effectively be transmitted and/or received.

Figure 3:
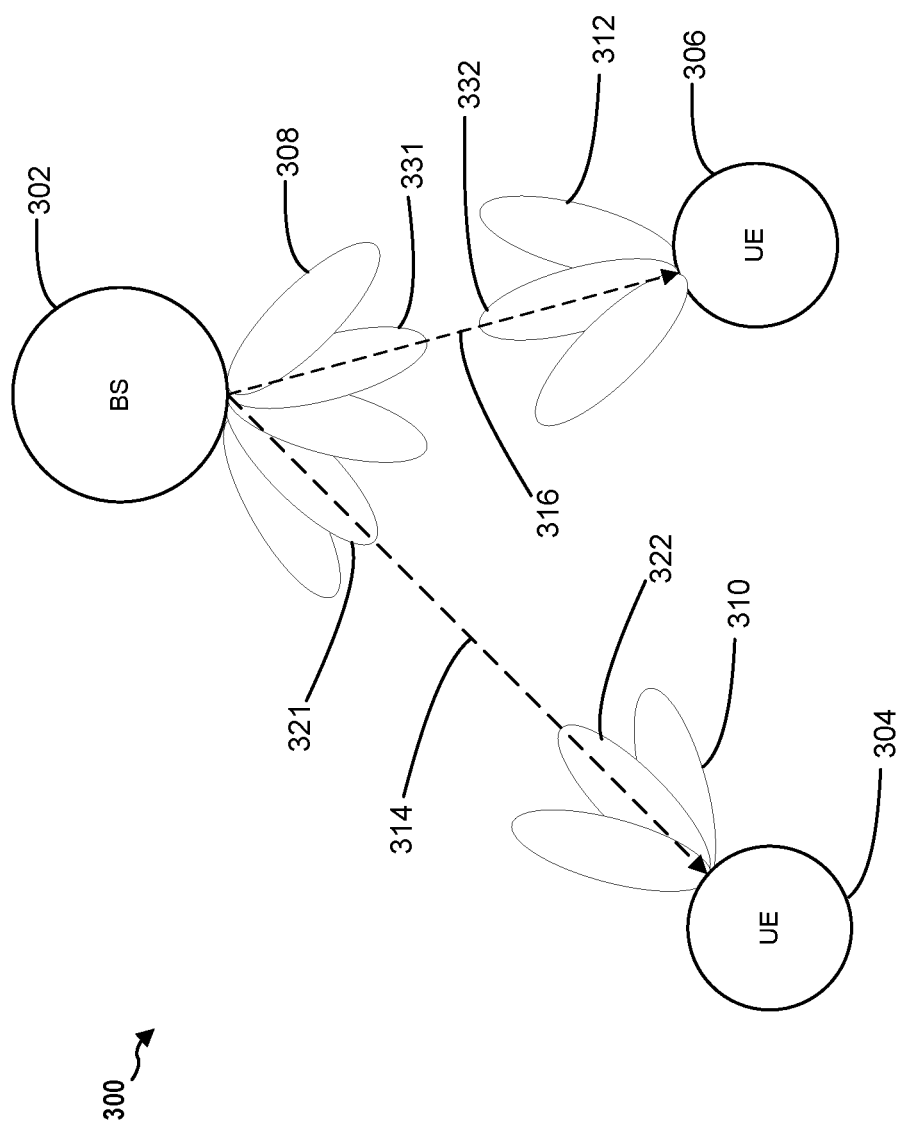
FIG. 3 is a diagram illustrating an example of downlink wireless communication performed in a wireless communication system according to some embodiments of the present disclosure.

FIG. 3 is a diagram illustrating an example of downlink wireless communication performed in a wireless communication system according to some embodiments of the present disclosure. In FIG. 3, a base station 302 communicates with a first mobile device 304 and a second mobile device 306 via different beamforming directions. As indicated by a set of beams 308, the base station 302 may communicate via any one of a plural of directional beams. As indicated by a set of beams 310, the first mobile device 104 may communicate via any one of a plurality of directional beams. As indicated by a set of beams 312, the second mobile device 306 may communicate via any one of a plurality of directional beams. Thus, at a given point in time, the base station 302 may communicate with the first mobile device 304 via a first beamforming direction 314 and communicate with the second mobile device 306 via a second beamforming direction 316. As illustrated in FIG. 3, the beamforming directions from the base station 302 to first mobile device 304 and the second mobile device 306 are distinct.

In some embodiments, a base station transmission beam and a corresponding mobile device reception beam used for downlink communication may be referred to as a downlink beam pair link (BPL). For example, one BPL illustrated in FIG. 3 may include BS transmission beam 321 and UE reception beam 322 associated with beamforming direction 314. Another BPL illustrated in FIG. 3 may include BS transmission beam 331 and UE reception beam 332 associated with beamforming direction 316. In some embodiments, a mobile device and a base station may be associated with multiple downlink and/or uplink BPLs. For example, as a mobile device moves in a network, a beam used by the mobile device for reception during downlink communication and a beam used by the base station for transmission during downlink communication may change and therefore establish other downlink BPLs between the base station and the mobile device.

Beams to be used by base stations for uplink wireless communication may be determined in various ways. In some embodiments, because base stations typically possess full beamforming reciprocity capabilities, determining a reception beam for uplink wireless communication may be trivial for a base station. For example, with reference to FIG. 3, base station 302 may use beam 321 to receive information provided through uplink wireless communication with mobile device 304. In other words, the base station 302 may configure its antennas to form a reception beam 321 for uplink communication with mobile device 304 that has the same directivity/spatial patterns as the transmission beam 321 used for downlink communication with mobile device 304. Similarly, base station 302 may use beam 331 to receive information provided through uplink wireless communication with mobile device 306 by configuring its antennas to form a reception beam 331 for uplink communication that has the same directivity/spatial patterns as the transmission beam 331 used for downlink communication with mobile device 306.

When the transmission beam 321 of base station 302 used for downlink communication with mobile device 304 is in the same beamforming direction 314 as the reception beam 321 of base station 302 used for uplink communication with mobile device 304, the beams 321 used by the base station 302 for downlink and uplink communication may be referred to as reciprocal beams and the base station may be described as having full beamforming reciprocity capabilities. In other words, the base station 302 may be described as having full beamforming reciprocity capabilities because of its ability to perform the reciprocal configurations of its antennas to form transmission and reception beams that have the same directivity pattern properties. In some embodiments, the antennas used to form a transmission beam may be the same as the antennas used to form a reception beam. In other embodiments, the antennas used to form a transmission beam may be different than the antennas used to form a reception beam.

Beams to be used by mobile devices for uplink wireless communication may also be determined in various ways. In some embodiments, the determination of beams to be used by a mobile device for uplink wireless communication may depend on the beamforming reciprocity capabilities of the mobile device.

Figure 4:
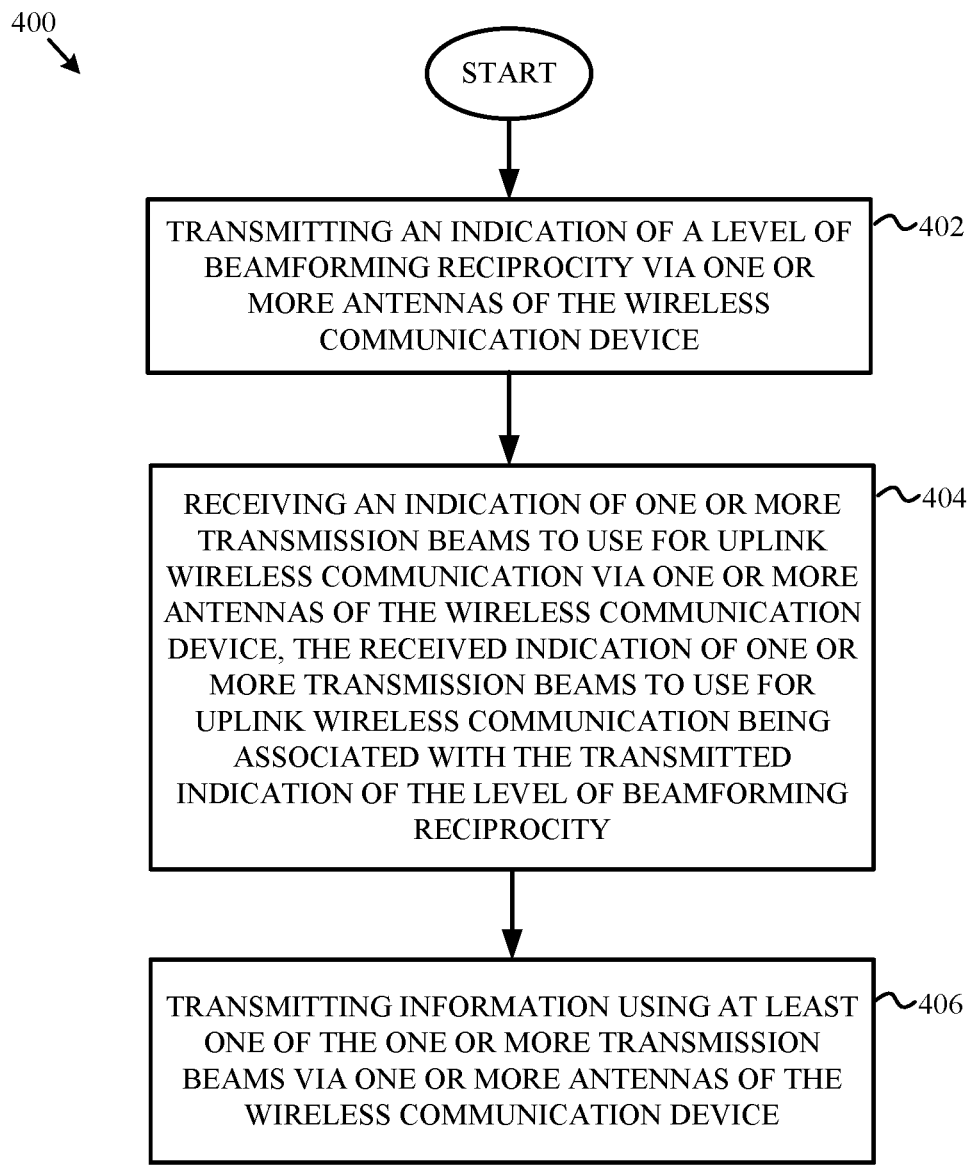
FIG. 4 is a block diagram illustrating a method for identifying beams for use in uplink wireless communication according to some embodiments of the present disclosure.

FIG. 4 is a block diagram illustrating a method for identifying beams for use in uplink wireless communication according to some embodiments of the present disclosure. Aspects of method 400 may be implemented with the aspects of this disclosure described with respect to FIGS. 1-3 and 5-6. For example, with reference to FIG. 2, controller/processor 280 of UE 115 may control UE 115 to perform the steps of method 400. Specifically, method 400 includes, at block 402, the step of transmitting, by a processor of the wireless communication device, an indication of a level of beamforming reciprocity via one or more antennas of the wireless communication device. With reference to FIG. 2, in some embodiments, a means for transmitting an indication of a level of beamforming reciprocity may include the UE 115, and more specifically the components of the UE 115, such as, for example, controller/processor 280 and components of the UE 115 that are controlled/directed by controller/processor 280 to cause the UE 115 to transmit an indication of a level of beamforming reciprocity.

At block 404, method 400 includes the step of receiving, by the processor, an indication of one or more transmission beams to use for uplink wireless communication via one or more antennas of the wireless communication device, the received indication of one or more transmission beams to use for uplink wireless communication being associated with the transmitted indication of the level of beamforming reciprocity. With reference to FIG. 2, in some embodiments, a means for receiving an indication of one or more transmission beams to use for uplink wireless communication may include the UE 115, and more specifically the components of the UE 115, such as, for example, controller/processor 280 and components of the UE 115 that are controlled/directed by controller/processor 280 to cause the UE 115 to receive an indication of one or more transmission beams to use for uplink wireless communication.

At block 406, method 400 includes the step of transmitting, by the processor, information using at least one of the one or more transmission beams via one or more antennas of the wireless communication device. With reference to FIG. 2, in some embodiments, a means for transmitting information using at least one of the one or more transmission beams may include the UE 115, and more specifically the components of the UE 115, such as, for example, controller/processor 280 and components of the UE 115 that are controlled/directed by controller/processor 280 to cause the UE 115 to transmit information using at least one of the one or more transmission beams.

Beamforming reciprocity level indications may take on many forms or be expressed in a variety of ways. Generally, beamforming reciprocity level indications can indicate types or capabilities for engaging in beamforming communications (e.g., reciprocal beamforming capabilities between multiple devices). In some embodiments, the indication of the level of beamforming reciprocity may include at least one of full reciprocity, partial reciprocity, or no reciprocity. In other words, a mobile device may be configured to transmit to a base station, and a base station may be configured to receive from a mobile device, an indication as to whether the mobile device is capable of full beamforming reciprocity, partial beamforming reciprocity, or no beamforming reciprocity. Additional features related to beamforming reciprocity levels are described below with reference to additional embodiments.

In one embodiment, a mobile device may be considered to have full beamforming reciprocity capabilities when the mobile device has the ability to configure its antennas to form a transmission beam for uplink communication that has the same directivity pattern properties as a reception beam used for downlink communication.

In another embodiment, a mobile device may be considered to have partial beamforming reciprocity capabilities when the mobile device has the ability to configure its antennas to form a transmission beam for uplink communication that has the same directivity pattern properties as a reception beam used for downlink communication but the mobile device is currently unable to use the reciprocal transmission beam for uplink communication. For example, the mobile device may not be able to use a reciprocal transmission beam because the reciprocal transmission beam may cause harm to a user or because the reciprocal transmission beam may cause the mobile device to consume too much power.

In other embodiments, a mobile device may be considered to have partial beamforming reciprocity capabilities when the mobile device can form a transmission beam for uplink communication that has directivity pattern properties that are close to the directivity pattern properties of a reception beam used for downlink communication but that are not exactly the same as the directivity pattern properties of the reception beam used for downlink communication.

In certain embodiments, the indication of the level of beamforming reciprocity may also include an estimate of a number of transmission beams to be used for uplink beam training. In some embodiments, the number of transmission beams to be used for uplink beam training may be smaller when the mobile device is capable of full beamforming reciprocity or is capable of partial beamforming reciprocity than when the mobile device is not capable of full beamforming reciprocity or is not capable of partial beamforming reciprocity.

In addition, in some embodiments, the number of transmission beams to be used for uplink beam training that is provided to the base station as an indication of the level of the beamforming reciprocity capabilities of the mobile device may be different for different downlink BPLs. For example, as described previously, a mobile device and a base station may be associated with multiple downlink and/or uplink BPLs. In some embodiments, for a first downlink BPL in which the mobile device is using a first specific reception beam for downlink communication, the mobile device may need to use more uplink transmission beam candidates for uplink beam training than the number of uplink transmission beam candidates needed for uplink beam training when the mobile device is using a second specific reception beam part of a second downlink BPL for downlink communication.

According to some embodiments, there may be a difference in the number of transmission beams to be used for uplink beam training when the mobile device uses different downlink reception beams part of different downlink BPLs for downlink communication because the mobile device may have previously performed some uplink beam training for some downlink BPLs. Thus, when the mobile device uses a reception beam for downlink communication that was previously used, the mobile device may already know of some transmission beams that may be used for uplink communication based on previous uplink training that was performed, and as a result may be able to use less transmission beams in subsequent uplink training sessions. In other embodiments, the differences in the number of transmission beams to be used for uplink beam training when the mobile device uses different downlink reception beams part of different downlink BPLs for downlink communication may be a result of the properties of the mobile device's beamforming hardware.

According to some embodiments, the indication of a level of beamforming reciprocity may be transmitted in a variety of manners. This can include using one or more channels. For example, beamforming reciprocity information (e.g., levels) can be transmitted in a physical uplink control channel (PUCCH) and/or a physical uplink shared channel (PUSCH). In other embodiments, the indication of a level of beamforming reciprocity may also be transmitted in a random access channel (RACH) and/or using radio resource control (RRC) resources.

Figure 5:
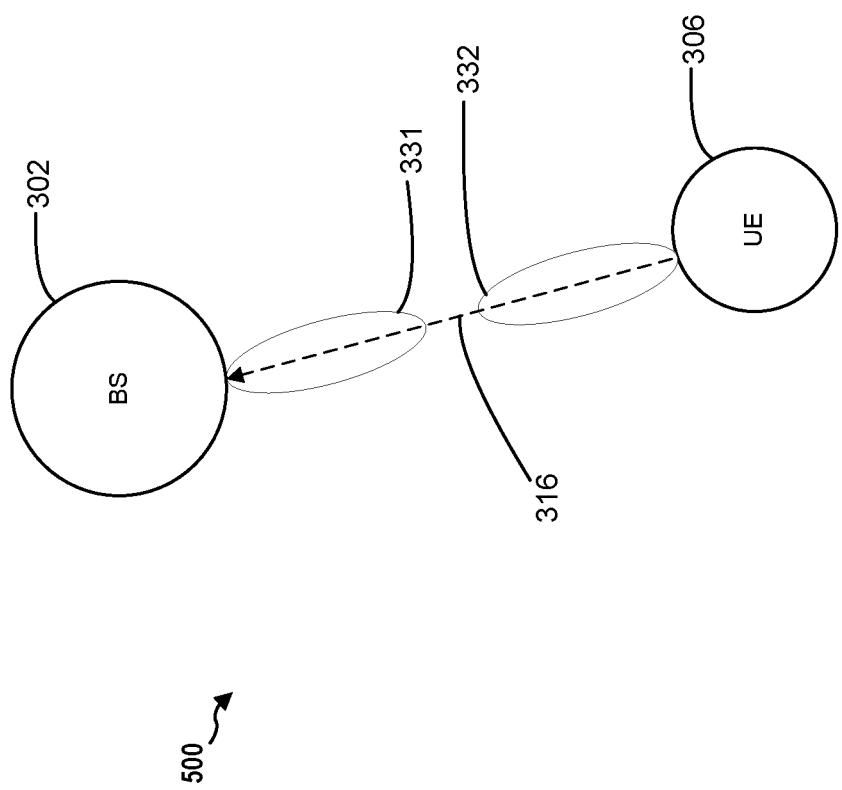
FIG. 5 is a diagram illustrating an example of uplink wireless communication performed in a wireless communication system when a mobile device is capable of full beamforming reciprocity according to some embodiments of the present disclosure.

FIG. 5 is a diagram illustrating an example of uplink wireless communication performed in a wireless communication system when a mobile device is capable of full beamforming reciprocity according to some embodiments of the present disclosure. In particular, when the beamforming reciprocity level indication indicates full reciprocity, the mobile device may be configured to receive from a base station, and the base station may be configured to transmit to a mobile device, an instruction to use a reciprocal transmission beam, for uplink wireless communication, that has directivity pattern properties that are reciprocal directivity pattern properties of directivity pattern properties of a reception beam used for downlink wireless communication. That is, in some scenarios, when the beamforming reciprocity level indication transmitted by the mobile device to the base station indicates that the mobile device is capable of full beamforming reciprocity, the mobile device may be configured to receive an instruction to use a reciprocal transmission beam for uplink wireless communication. Therefore, a mobile device being configured, such as at block 404 illustrated in FIG. 4, to receive an indication of one or more transmission beams to use for uplink wireless communication based on the level of beamforming reciprocity may include the mobile device being configured to receive an instruction to use a reciprocal transmission beam for uplink wireless communication. With reference to FIG. 2, in some embodiments, a means for receiving an instruction to use a reciprocal transmission beam for uplink wireless communication may include the UE 115, and more specifically the components of the UE 115, such as, for example, controller/processor 280 and components of the UE 115 that are controlled/directed by controller/processor 280 to cause the UE 115 to receive an instruction to use a reciprocal transmission beam for uplink wireless communication. Similarly, with reference to FIG. 2, in some embodiments, a means for transmitting an instruction to use a reciprocal transmission beam for uplink wireless communication may include the base station 105, and more specifically the components of the base station 105, such as, for example, controller/processor 240 and components of the base station 105 that are controlled/directed by controller/processor 240 to cause the base station 105 to transmit an instruction to use a reciprocal transmission beam for uplink wireless communication.

Similarly, when the beamforming reciprocity level indication received by the base station from the mobile device indicates that the mobile device is capable of full beamforming reciprocity, the base station may be configured to transmit an instruction to use a reciprocal transmission beam for uplink wireless communication. Therefore, a base station being configured to transmit an indication of one or more transmission beams to use for uplink wireless communication based on the level of beamforming reciprocity may include the base station being configured to transmit an instruction to use a reciprocal transmission beam for uplink wireless communication.

FIG. 5 provides an illustration of such an embodiment in which the mobile device uses a reciprocal transmission beam for uplink wireless communication. FIG. 5 reproduces the communication link illustrated in FIG. 3 between mobile device 306 and base station 302 and therefore generally uses the same notation as FIG. 3. While FIG. 3 illustrates downlink communication between base station 302 and mobile device 306, FIG. 5 illustrates uplink communication between base station 302 and mobile device 306. In FIG. 5, the mobile device 306 is illustrated as being capable of full beamforming reciprocity (though in some scenarios varying reciprocity levels are possible). The mobile device 306 may receive an instruction from the base station 302 to use a reciprocal transmission beam for uplink wireless communication.

As discussed with reference to FIG. 3, in the downlink, base station transmission beam 331 and mobile device reception beam 332 may be a BPL used to perform downlink communication between base station 302 and mobile device 306. Accordingly, in some embodiments, when the mobile device 306 is instructed to use a reciprocal transmission beam for uplink communication, the mobile device 306 may use beam 332 as the transmission beam for uplink communication. In other words, mobile device 306 may configure its antenna to create a transmission beam 332 for use during uplink wireless communication that has the same directivity pattern properties as the reception beam 332 used by the mobile device 306 during downlink wireless communication. In some embodiments, directivity pattern properties may refer to properties of a beam formed using one or more antennas of a mobile device 306 or base station 302. For example, a directivity pattern property may refer to a three-dimensional direction.

In some embodiments, the use in wireless communication systems of mobile devices that are capable of full beamforming reciprocity may enable air link overhead savings. These advantageous savings can be accomplished by capitalizing on reciprocal capabilities of a mobile device. For example, utilizing these capabilities, a mobile device can be configured to set up uplink transmission beams for the mobile device instead of having to perform uplink beam training.

Configuring a mobile device 306 to transmit information using at least one of the one or more transmission beams can be accomplished in a variety of manners. For example, transmitting, such as at block 406 illustrated in FIG. 4, may include configuring a mobile device 306 to transmit information using a reciprocal transmission beam, such as reciprocal transmission beam 332 illustrated in FIG. 5. With reference to FIG. 2, in some embodiments, a means for transmitting information using the reciprocal transmission beam may include the UE 115, and more specifically the components of the UE 115, such as, for example, controller/processor 280 and components of the UE 115 that are controlled/directed by controller/processor 280 to cause the UE 115 to transmit information using the reciprocal transmission beam. Similarly, configuring a base station 302 to receive information that has been transmitted using at least one of the one or more transmission beams may include configuring the base station 302 to receive information that has been transmitted using the reciprocal transmission beam, such as reciprocal transmission beam 332 illustrated in FIG. 5. With reference to FIG. 2, in some embodiments, a means for receiving information that has been transmitted using the reciprocal transmission beam may include the base station 105, and more specifically the components of the base station 105, such as, for example, controller/processor 240 and components of the base station 105 that are controlled/directed by controller/processor 240 to cause the base station 105 to receive information that has been transmitted using the reciprocal transmission beam.

In some embodiments, such as when the mobile device is not capable of full beamforming reciprocity or is capable of only partial beamforming reciprocity, the mobile device and the base station may undergo uplink beam training to determine a transmission beam to be used by the mobile device for uplink wireless communication. In other embodiments, even when a mobile device is not capable of full beamforming reciprocity or is capable of only partial beamforming reciprocity, a transmission beam may be identified for use by the mobile device for uplink wireless communication without the mobile device and the base station undergoing uplink beam training. For example, a base station may determine that uplink beam training is not necessary and instead instruct the mobile device to communicate on the uplink using a transmission beam determined without uplink training.

In particular, in some embodiments, a mobile device may be configured to transmit directivity pattern properties associated with a proposed transmission beam for uplink wireless communication. With reference to FIG. 2, in some embodiments, a means for transmitting directivity pattern properties associated with a proposed transmission beam for uplink wireless communication may include the UE 115, and more specifically the components of the UE 115, such as, for example, controller/processor 280 and components of the UE 115 that are controlled/directed by controller/processor 280 to cause the UE 115 to transmit directivity pattern properties associated with a proposed transmission beam for uplink wireless communication.

Similarly, a base station may be configured to receive directivity pattern properties associated with a proposed transmission beam for uplink wireless communication. The directivity pattern properties may correspond to an initial transmission beam formed by the mobile device for uplink wireless communication. For example, in one embodiment, the mobile device may estimate the directivity pattern properties of a transmission beam for uplink communication based on the directivity pattern properties of a reception beam used for downlink wireless communication, and subsequently form a transmission beam for uplink communication based on the estimated directivity pattern properties. Although the estimated directivity pattern properties may yield a transmission beam that is not a reciprocal transmission beam of the downlink reception beam, the proposed initial uplink transmission beam may have directivity pattern properties that are close to that of a reciprocal transmission beam. With reference to FIG. 2, in some embodiments, a means for receiving directivity pattern properties associated with a proposed transmission beam for uplink wireless communication may include the base station 105, and more specifically the components of the base station 105, such as, for example, controller/processor 240 and components of the base station 105 that are controlled/directed by controller/processor 240 to cause the base station 105 to receive directivity pattern properties associated with a proposed transmission beam for uplink wireless communication.

In addition, the mobile device may be configured to transmit quality information associated with uplink wireless communication performed using the proposed transmission beam. Similarly, the base station may be configured to receive quality information associated with uplink wireless communication performed using the proposed transmission beam. For example, the mobile device may be configured to transmit, and the base station may be configured to receive, a channel quality indicator (CQI) signal, a modulation and coding scheme (MCS) signal, and/or other communication link quality indicator. In some embodiments, the quality information may also include a specific power quality metric, such as achievable Total Radiated Power (TRP) or achievable Effective Isotropic Radiated Power (EIRP). The mobile device may also be configured to transmit, and the base station may also be configured to receive, a quality-improvement estimate that provides an indication of how much the quality of uplink wireless communication may be improved through uplink beam training. As examples, and not limitations, the quality-improvement estimate may indicate that an overall quality improvement of 20% can be expected or that a signal strength improvement of 15 dBm can be expected. With reference to FIG. 2, in some embodiments, a means for transmitting quality information or transmitting a quality-improvement estimate may include the UE 115, and more specifically the components of the UE 115, such as, for example, controller/processor 280 and components of the UE 115 that are controlled/directed by controller/processor 280 to cause the UE 115 to transmit quality information or transmit a quality-improvement estimate. Similarly, with reference to FIG. 2, in some embodiments, a means for receiving quality information or receiving a quality-improvement estimate may include the base station 105, and more specifically the components of the base station 105, such as, for example, controller/processor 240 and components of the base station 105 that are controlled/directed by controller/processor 240 to cause the base station 105 to receive quality information or receive a quality-improvement estimate.

According to some embodiments, the base station may be configured to process the quality information and the quality improvement estimate. Processing this information can aid in determining whether uplink beam training is necessary or if the mobile device may use the proposed uplink transmission beam for uplink wireless communication with the base station. For example, the base station may be configured to transmit an instruction to use the proposed transmission beam for uplink wireless communication based on processing of the transmitted quality information and quality improvement estimate. Similarly, the mobile device may be configured to receive an instruction to use the proposed transmission beam for uplink wireless communication based on processing by the base station of the transmitted quality information and quality improvement estimate. In particular, in one embodiment, based on processing of the quality information and the quality improvement estimate, the base station may determine that the quality of uplink communication using the proposed uplink transmission beam is better than a channel quality threshold for uplink wireless communication or that the improvement in the quality of the uplink communication that would be obtained from uplink beam training is not greater than an channel improvement threshold.

Based on a determination that the quality of uplink communication using the proposed uplink transmission beam is better than a channel quality threshold for uplink wireless communication and/or a determination that the improvement in the quality of the uplink communication that would be obtained from uplink beam training is not greater than an channel improvement threshold, the base station may transmit, and the mobile device may receive, an instruction to use the proposed transmission beam for uplink wireless communication. Accordingly, in some embodiments, the mobile device being configured to receive an indication of one or more transmission beams to use for uplink wireless communication based on the level of beamforming reciprocity, such as at block 404 illustrated in FIG. 4, may include the mobile device being configured to receive an instruction to use the proposed transmission beam for uplink wireless communication. With reference to FIG. 2, in some embodiments, a means for receiving an instruction to use the proposed transmission beam for uplink wireless communication in response to processing by a base station of the transmitted quality information and quality improvement estimate may include the UE 115, and more specifically the components of the UE 115, such as, for example, controller/processor 280 and components of the UE 115 that are controlled/directed by controller/processor 280 to cause the UE 115 to receive an instruction to use the proposed transmission beam for uplink wireless communication in response to processing by a base station of the transmitted quality information and quality improvement estimate.

Similarly, a base station being configured to transmit an indication of one or more transmission beams to use for uplink wireless communication based on the level of beamforming reciprocity may include the base station being configured to transmit an instruction to use the proposed transmission beam for uplink wireless communication. With reference to FIG. 2, in some embodiments, a means for transmitting an instruction to use the proposed transmission beam for uplink wireless communication based on processing of the transmitted quality information and quality improvement estimate may include the base station 105, and more specifically the components of the base station 105, such as, for example, controller/processor 240 and components of the base station 105 that are controlled/directed by controller/processor 240 to cause the base station 105 to transmit an instruction to use the proposed transmission beam for uplink wireless communication based on processing of the transmitted quality information and quality improvement estimate.

Accordingly, in some embodiments, configuring the mobile device to transmit information using at least one of the one or more transmission beams, such as at block 406 illustrated in FIG. 4, may include configuring the mobile device to transmit information using the proposed transmission beam for uplink wireless communication. With reference to FIG. 2, in some embodiments, a means for transmitting information using the proposed transmission beam for uplink wireless communication may include the UE 115, and more specifically the components of the UE 115, such as, for example, controller/processor 280 and components of the UE 115 that are controlled/directed by controller/processor 280 to cause the UE 115 to transmit information using the proposed transmission beam for uplink wireless communication.

Similarly, configuring a base station to receive information that has been transmitted using at least one of the one or more transmission beams may include configuring the base station to receive information that has been transmitted using the proposed transmission beam for uplink wireless communication. With reference to FIG. 2, in some embodiments, a means for receiving information that has been transmitted using the proposed transmission beam for uplink wireless communication may include the base station 105, and more specifically the components of the base station 105, such as, for example, controller/processor 240 and components of the base station 105 that are controlled/directed by controller/processor 240 to cause the base station 105 to receive information that has been transmitted using the proposed transmission beam for uplink wireless communication.

In some embodiments, the mobile device may receive from the base station, and the base station may transmit to the mobile device, an instruction to perform uplink beam training when the beamforming reciprocity level indication indicates less than full reciprocity. In other words, when the reciprocity level indication indicates that the mobile device is not capable of full beamforming reciprocity, the base station may transmit to the mobile device an instruction to perform uplink beam training. With reference to FIG. 2, in some embodiments, a means for receiving an instruction to perform uplink beam training when the beamforming reciprocity level indication indicates less than full reciprocity may include the UE 115, and more specifically the components of the UE 115, such as, for example, controller/processor 280 and components of the UE 115 that are controlled/directed by controller/processor 280 to cause the UE 115 to receive an instruction to perform uplink beam training when the beamforming reciprocity level indication indicates less than full reciprocity. Similarly, with reference to FIG. 2, in some embodiments, a means for transmitting an instruction to perform uplink beam training when the beamforming reciprocity level indication indicates less than full reciprocity may include the base station 105, and more specifically the components of the base station 105, such as, for example, controller/processor 240 and components of the base station 105 that are controlled/directed by controller/processor 240 to cause the base station 105 to transmit an instruction to perform uplink beam training when the beamforming reciprocity level indication indicates less than full reciprocity.

In other embodiments, the base station may transmit to the mobile device an instruction to perform uplink beam training based on a determination that the quality of uplink communication using the proposed uplink transmission beam is not better than a channel quality threshold for uplink wireless communication. In yet another embodiment, the base station may transmit to the mobile device an instruction to perform uplink beam training based on a determination that the improvement in the quality of the uplink communication that would be obtained from uplink beam training is greater than an channel improvement threshold.

In some embodiments, along with the instruction to perform uplink beam training, the base station may also transmit to the mobile device, and the mobile device may receive from the base station, an indication of the number of transmission beams to be used for uplink beam training. With reference to FIG. 2, in some embodiments, a means for receiving an indication of a number of transmission beams to be used for uplink beam training may include the UE 115, and more specifically the components of the UE 115, such as, for example, controller/processor 280 and components of the UE 115 that are controlled/directed by controller/processor 280 to cause the UE 115 to receive an indication of a number of transmission beams to be used for uplink beam training. Similarly, with reference to FIG. 2, in some embodiments, a means for transmitting an indication of a number of transmission beams to be used for uplink beam training may include the base station 105, and more specifically the components of the base station 105, such as, for example, controller/processor 240 and components of the base station 105 that are controlled/directed by controller/processor 240 to cause the base station 105 to transmit an indication of a number of transmission beams to be used for uplink beam training.

In another embodiment, when the beamforming reciprocity level indication indicates that the mobile device is capable of partial beamforming reciprocity, the base station may also transmit to the mobile device, along with the instruction to perform uplink beam training, coarse beamforming directivity pattern properties that may be used by the mobile device to set coarse directivity pattern properties of a plurality of beams to be used during uplink beam training. That is, in some embodiments, along with the instruction to perform uplink beam training, the base station may also transmit to the mobile device, and the mobile device may receive from the base station, directivity pattern properties associated with a reception beam used for downlink wireless communication. With reference to FIG. 2, in some embodiments, a means for receiving directivity pattern properties associated with a reception beam used for downlink wireless communication may include the UE 115, and more specifically the components of the UE 115, such as, for example, controller/processor 280 and components of the UE 115 that are controlled/directed by controller/processor 280 to cause the UE 115 to receive directivity pattern properties associated with a reception beam used for downlink wireless communication. Similarly, with reference to FIG. 2, in some embodiments, a means for transmitting directivity pattern properties associated with a reception beam used for downlink wireless communication may include the base station 105, and more specifically the components of the base station 105, such as, for example, controller/processor 240 and components of the base station 105 that are controlled/directed by controller/processor 240 to cause the base station 105 to transmit directivity pattern properties associated with a reception beam used for downlink wireless communication.

In another embodiment, the base station may also transmit to the mobile device, along with the instruction to perform uplink beam training, beamforming directivity pattern properties of a reception beam used by the mobile device as part of a BPL for downlink wireless communication. According to another embodiment, the base station may also transmit to the mobile device, along with the instruction to perform uplink beam training, beamforming directivity pattern properties of a downlink base station transmission beam that the mobile device may be able to receive with acceptable power or in accordance with a communication metric.

Figure 6:
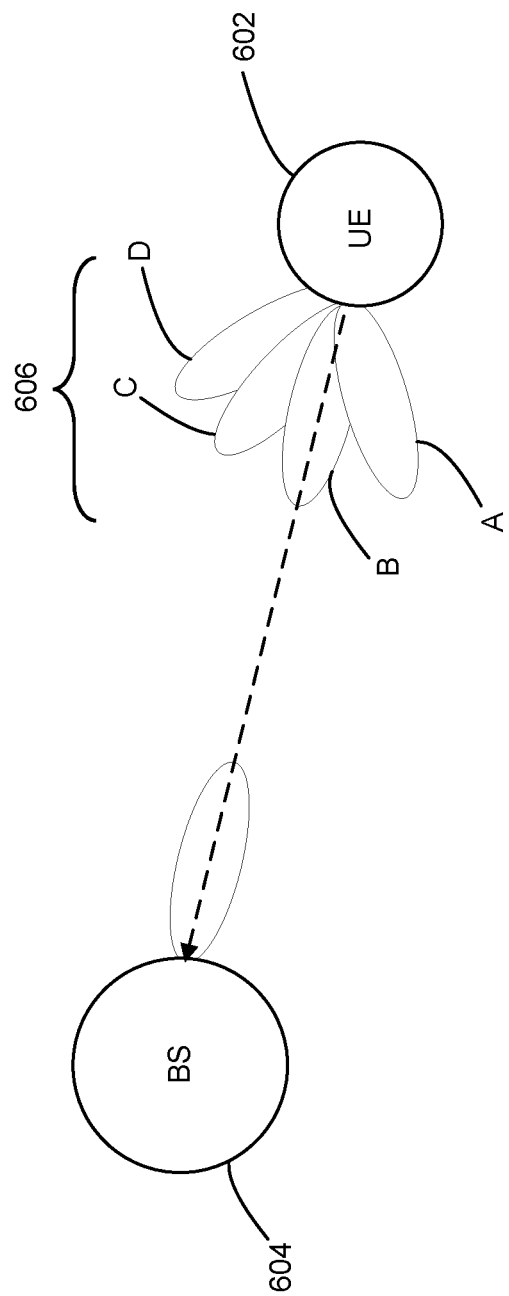
FIG. 6 is a diagram illustrating an example of uplink beam training performed in a wireless communication system according to some embodiments of the present disclosure.

According to some embodiments, information received by a mobile device from a base station along with the instruction to perform uplink beam training may be used to set directivity pattern properties of at least one of the transmission beams the mobile device creates for uplink beam training. FIG. 6 provides additional details regarding beams used for uplink beam training and an example process that a mobile device and a base station can follow for uplink beam training.

FIG. 6 is a diagram illustrating an example of uplink beam training performed in a wireless communication system according to some embodiments of the present disclosure. As illustrated in FIG. 6, uplink beam training may include the mobile device 602 transmitting, and the base station 604 receiving, information using a plurality of candidate transmission beams 606. In other words, uplink beam training may include the mobile device 602 transmitting information using a plurality of candidate transmission beams 606 upon receiving the instruction to perform uplink beam training. With reference to FIG. 2, in some embodiments, a means for transmitting information using a plurality of candidate transmission beams upon receiving the instruction to perform uplink beam training may include the UE 115, and more specifically the components of the UE 115, such as, for example, controller/processor 280 and components of the UE 115 that are controlled/directed by controller/processor 280 to cause the UE 115 to transmit information using a plurality of candidate transmission beams upon receiving the instruction to perform uplink beam training.

Similarly, uplink beam training may include the base station 604 receiving information that has been transmitted using a plurality of candidate transmission beams 606 in response to the transmission of the instruction to perform uplink beam training. With reference to FIG. 2, in some embodiments, a means for receiving information that has been transmitted using a plurality of candidate transmission beams in response to the transmission of the instruction to perform uplink beam training may include the base station 105, and more specifically the components of the base station 105, such as, for example, controller/processor 240 and components of the base station 105 that are controlled/directed by controller/processor 240 to cause the base station 105 to receive information that has been transmitted using a plurality of candidate transmission beams in response to the transmission of the instruction to perform uplink beam training.

In some embodiments, at least one of the plurality of candidate transmission beams 606 may include directivity pattern properties that are approximately reciprocal to the received directivity pattern properties associated with the reception beam used for downlink wireless communication. For example, according to some embodiments, the information received by the mobile device 602 from the base station 604 along with the instruction to perform uplink beam training may be used to set directivity pattern properties of at least one of the transmission beams the mobile device 602 creates for uplink beam training. Specifically, in one embodiment, a mobile device 602 may use the information received by the mobile device 602 from the base station 604 along with the instruction to perform uplink beam training to set a directivity pattern of at least one of the plurality of candidate transmission beams 606 to be approximately reciprocal to the directivity pattern properties associated with a reception beam used for downlink wireless communication. With reference to FIG. 2, in some embodiments, a means for setting a directivity pattern of at least one of the plurality of candidate transmission beams may include the UE 115, and more specifically the components of the UE 115, such as, for example, controller/processor 280 and components of the UE 115 that are controlled/directed by controller/processor 280 to cause the UE 115 to set a directivity pattern of at least one of the plurality of candidate transmission beams.

As mentioned above, the directivity pattern properties associated with a reception beam used for downlink wireless communication may have been received by the mobile device 602 from the base station 604 along with the instruction to perform uplink beam training. In another embodiment, one of the plurality of candidate transmission beams 606 may be the proposed transmission beam sent by the mobile device 602 to the base station 604 prior to starting uplink beam training. In general, at least one of the plurality of candidate transmission beams 606 used for uplink beam training, e.g., an initial uplink training beam, may be set based on an estimate of a transmission beam to be used for uplink communication. According to some embodiments, the estimate of the transmission beam may be derived from the information used by the mobile device 602 to determine the proposed transmission beam for uplink communication or from information received by the mobile device 602 from the base station 604 along with the instruction to perform uplink beam training.

In some embodiments, the number of transmission beams in the plurality of candidate transmission beams 606 corresponds to the received indication of the number of transmission beams to be used for uplink beam training. In other embodiments, the number of transmission beams used for uplink beam training may be determined by the mobile device based on the level of beamforming reciprocity possessed by the mobile device, based on a number provided to the mobile device by the base station along with the instruction to perform uplink beam training, and/or based on a number transmitted to the base station by the mobile device. In the embodiment illustrated in FIG. 6, the plurality of candidate transmission beams 606 used for uplink beam training includes four beams 606A-D. In certain embodiments, the number of transmission beams used for uplink beam training may be contained in a PUCCH message, may be part of a request for uplink beam training sent in a PUSCH message, or may be part of a response to downlink beam training sent in a RRC message.

In some embodiments, the plurality of candidate transmission beams 606 used for uplink beam training may be determined after the initial beam has been estimated and set as described above. According to one embodiment, the mobile device 602 may select beams in the vicinity of the initially-set uplink transmission beam for inclusion in the plurality of candidate transmission beams 606 used for uplink beam training. Therefore, in a sense, the plurality of candidate transmission beams 606 used for uplink beam training may be obtained by sweeping beams in the vicinity of the initially-set uplink transmission beam.

In some embodiments, each of the plurality of candidate transmission beams 606 may be transmitted in a different symbol in accordance with a schedule provided by the base station 604. For example, in one embodiment, the base station 604 may transmit, and the mobile device 602 may receive, along with the instruction to perform uplink beam training, a schedule for performing uplink beam training. As a specific example, in one embodiment, the base station 604 may inform the mobile device 602 that four symbols, i.e., communication channel resources, have been allocated to the mobile device 602 for performing uplink beam training with the plurality of candidate transmission beams 606. In response, the mobile device 602 may transmit information in each symbol using a different one of the plurality of candidate transmission beams 606 to transmit information in a different symbol. One of skill in the art will readily recognize that the number of beams in the plurality of candidate transmission beams 606 may be a number other than four in other embodiments and that the plurality of candidate transmission beams 606 is illustrated in FIG. 6 as having four beams only for illustrative purposes. Similarly, one of skill in the art will readily recognize that in other embodiments of this disclosure a base station may allocate any number of symbols or other communication channel resources for uplink beam training. The allocation of four symbols for uplink beam training as described above is only for illustrative purposes.

According to some embodiments, the channel resources that may be used for uplink beam training may include the random access channel (RACH), sounding reference signals (SRSs), and hybrid automatic repeat request (HARQ).

As described above and illustrated in FIG. 6, uplink beam training may include the mobile device 602 transmitting, and the base station 604 receiving, information using a plurality of candidate transmission beams 606. In other words, uplink beam training may include the mobile device 602 transmitting information using a plurality of candidate transmission beams 606 upon receiving the instruction to perform uplink beam training. Similarly, uplink beam training may include the base station 604 receiving information that has been transmitted using a plurality of candidate transmission beams 606 in response to the transmission of the instruction to perform uplink beam training. In some embodiments, the base station 604 may use a reciprocal reception beam to receive the uplink training beams 606, i.e., a reception beam that has directivity pattern properties that are substantially the same as a transmission beam used for downlink communication.

In some embodiments, the base station 604 may process the information received via the plurality of candidate transmission beams 606. In other words, the base station 604 may process information received via the plurality of candidate transmission beams 606 in different symbols as part of uplink beam training. For example, in some embodiments, the base station 604 may process information received via the uplink training beams 606 to associate a communication link quality metric with each of the uplink training beams 606. Specifically, as part of the processing performed in uplink beam training, the base station 604 may measure the quality of each of the beams 606 used for uplink beam training. In other embodiments, the base station 604 may process information received via the uplink training beams 606 to associate other metrics with each of the uplink training beams 606. For example, in another embodiment, the base station 604 may process information received via the uplink training beams 606 to associate a signal power metric with each of the uplink training beams 606. With reference to FIG. 2, in some embodiments, a means for processing the information received via the plurality of candidate transmission beams may include the base station 105, and more specifically the components of the base station 105, such as, for example, controller/processor 240 and components of the base station 105 that are controlled/directed by controller/processor 240 to cause the base station 105 to process the information received via the plurality of candidate transmission beams.

According to some embodiments, based on the processing, the base station 604 may identify one or more transmission beams that may be used by the mobile device 602 for uplink wireless communication. For example, in one embodiment, the base station 604 may select the beam associated with the highest quality metric as the beam that should be used by the mobile device 602 for uplink communication. As an example with reference to FIG. 6, the base station 604 may identify beam 606B as the beam with the highest quality metric and select it as the beam that should be used by the mobile device 602 for uplink communication. In another embodiment, the base station 604 may select one or more beams, e.g., a subset of the beams, having the highest quality metrics as beams that the mobile device 602 may use for uplink communication.

In some embodiments, the base station 604 may transmit, and the mobile device 602 may receive, an indication of at least one of the plurality of candidate transmission beams 606 that may be used for uplink wireless communication. With reference to FIG. 2, in some embodiments, a means for receiving an indication of at least one of the plurality of candidate transmission beams that may be used for uplink wireless communication may include the UE 115, and more specifically the components of the UE 115, such as, for example, controller/processor 280 and components of the UE 115 that are controlled/directed by controller/processor 280 to cause the UE 115 to receive an indication of at least one of the plurality of candidate transmission beams that may be used for uplink wireless communication. Similarly, with reference to FIG. 2, in some embodiments, a means for transmitting an indication of at least one of the plurality of candidate transmission beams that may be used for uplink wireless communication may include the base station 105, and more specifically the components of the base station 105, such as, for example, controller/processor 240 and components of the base station 105 that are controlled/directed by controller/processor 240 to cause the base station 105 to transmit an indication of at least one of the plurality of candidate transmission beams that may be used for uplink wireless communication.

According to some embodiments, the indication of at least one of the plurality of candidate transmission beams that may be used for uplink wireless communication may be based on the processing of the information received via the plurality of candidate transmission beams 606. In other words, the base station 604 may transmit, and the mobile device 602 may receive, an indication of a transmission beam that should be used for uplink communication based on the processing of the information received via the uplink training beams 606 during uplink beam training. As an example with reference to FIG. 6, the base station 604 may transmit, and the mobile device 602 may receive, an indication that beam 606B should be used for uplink communication because it is the beam associated with the highest quality metric. In another embodiment, the base station 604 may transmit, and the mobile device 602 may receive, an indication that beams 606A and 606B may be used for uplink communication. Accordingly, in some embodiments, the mobile device 602 being configured to receive an indication of one or more transmission beams to use for uplink wireless communication based on the level of beamforming reciprocity, such as at block 404 illustrated in FIG. 4, may include the mobile device 602 being configured to receive an indication of at least one of the plurality of candidate transmission beams that may be used for uplink wireless communication. The indication of at least one of the plurality of candidate transmission beams that may be used for uplink wireless communication may be based on the processing by the base station 604 of the information received via the plurality of candidate transmission beams 606. Similarly, in some embodiments, the base station 604 being configured to transmit an indication of one or more transmission beams to use for uplink wireless communication based on the level of beamforming reciprocity may include the base station 604 being configured to transmit an indication of at least one of the plurality of candidate transmission beams that may be used for uplink wireless communication. The indication may be based on the processing of the information received via the plurality of candidate transmission beams 606.

Accordingly, in some embodiments, configuring the mobile device 602 to transmit information using at least one of the one or more transmission beams 606, such as at block 406 illustrated in FIG. 4, may include configuring the mobile device 602 to transmit information using the at least one of the plurality of candidate transmission beams 606. With reference to FIG. 2, in some embodiments, a means for transmitting information using the at least one of the plurality of candidate transmission beams may include the UE 115, and more specifically the components of the UE 115, such as, for example, controller/processor 280 and components of the UE 115 that are controlled/directed by controller/processor 280 to cause the UE 115 to transmit information using the at least one of the plurality of candidate transmission beams. Similarly, configuring a base station 604 to receive information that has been transmitted using at least one of the one or more transmission beams 606 may include configuring the base station 604 to receive information that has been transmitted using the at least one of the plurality of candidate transmission beams 606. With reference to FIG. 2, in some embodiments, a means for receiving information that has been transmitted using the at least one of the plurality of candidate transmission beams may include the base station 105, and more specifically the components of the base station 105, such as, for example, controller/processor 240 and components of the base station 105 that are controlled/directed by controller/processor 240 to cause the base station 105 to receive information that has been transmitted using the at least one of the plurality of candidate transmission beams.

In some embodiments, the base station may select the transmission beam that should be used by the mobile device for uplink communication based on other information as well. For example, in one embodiment, the mobile device may be configured to also transmit to the base station, and the base station may also be configured to receive from the mobile device, an indication of one or more preferred transmission beams to use for uplink wireless communication. With reference to FIG. 2, in some embodiments, a means for transmitting an indication of one or more preferred transmission beams to use for uplink wireless communication may include the UE 115, and more specifically the components of the UE 115, such as, for example, controller/processor 280 and components of the UE 115 that are controlled/directed by controller/processor 280 to cause the UE 115 to transmit an indication of one or more preferred transmission beams to use for uplink wireless communication. Similarly, with reference to FIG. 2, in some embodiments, a means for receiving an indication of one or more preferred transmission beams to use for uplink wireless communication may include the base station 105, and more specifically the components of the base station 105, such as, for example, controller/processor 240 and components of the base station 105 that are controlled/directed by controller/processor 240 to cause the base station 105 to receive an indication of one or more preferred transmission beams to use for uplink wireless communication.

According to an embodiment, the one or more preferred transmission beams may be reciprocal transmission beams that each reciprocally correspond to a reception beam used for downlink wireless communication as part of a BPL. In some embodiments, a mobile device and a base station may be associated with multiple BPLs. For example, as a mobile device moves in a network, a beam used by the mobile device for reception during downlink communication and a beam used by the base station for transmission during downlink communication may change and therefore establish other BPLs. The base station may store the multiple BPLs that were used by the base station and the mobile device for wireless communication. The stored BPLs may serve as a pool of BPLs from which the base station may select and indicate to a mobile device the transmission beam that should be used by the mobile device for uplink communication. Therefore, in some embodiments the one or more preferred transmission beams may be reciprocal transmission beams that each reciprocally correspond to a reception beam used for downlink wireless communication as part of one or more BPLs established between a base station and a mobile device.

In another embodiment, the mobile device may be configured to also transmit to the base station, and the base station may also be configured to receive from the mobile device, a priority level associated with each of the one or more preferred transmission beams. In certain embodiments, a priority level associated with a preferred transmission beam may indicate whether that particular transmission beam should be given priority over another of the one or more preferred transmission beams during selection of a transmission beam to use for uplink communication. As one example, and not limitation, in one embodiment the priority levels may be low, medium, or high priority. In another embodiment, the priority levels may be numeric, with higher numbers indicating higher priority (or vice versa). With reference to FIG. 2, in some embodiments, a means for transmitting a priority level associated with each of the one or more preferred transmission beams may include the UE 115, and more specifically the components of the UE 115, such as, for example, controller/processor 280 and components of the UE 115 that are controlled/directed by controller/processor 280 to cause the UE 115 to transmit a priority level associated with each of the one or more preferred transmission beams. Similarly, with reference to FIG. 2, in some embodiments, a means for receiving a priority level associated with each of the one or more preferred transmission beams may include the base station 105, and more specifically the components of the base station 105, such as, for example, controller/processor 240 and components of the base station 105 that are controlled/directed by controller/processor 240 to cause the base station 105 to receive a priority level associated with each of the one or more preferred transmission beams.

In still another embodiment, the mobile device may be configured to also transmit to the base station, and the base station may also be configured to receive from the mobile device, a quality metric for uplink wireless communication. In certain embodiments, a quality metric associated with an uplink transmission beam may indicate a level of uplink communication quality that may be achieved when that particular uplink transmission beam is used for uplink communication. As examples, and not limitations, a quality metric may be achievable TRP or achievable EIRP. With reference to FIG. 2, in some embodiments, a means for transmitting a quality metric for uplink wireless communication may include the UE 115, and more specifically the components of the UE 115, such as, for example, controller/processor 280 and components of the UE 115 that are controlled/directed by controller/processor 280 to cause the UE 115 to transmit a quality metric for uplink wireless communication. Similarly, with reference to FIG. 2, in some embodiments, a means for receiving a quality metric for uplink wireless communication may include the base station 105, and more specifically the components of the base station 105, such as, for example, controller/processor 240 and components of the base station 105 that are controlled/directed by controller/processor 240 to cause the base station 105 to receive a quality metric for uplink wireless communication.

In some embodiments, the information transmitted to the base station, such as the indication of the one or more preferred transmission beams, the priority levels, and the quality metric, may inform the base station of the relative performance metrics of the different uplink transmission beams. For example, the information may inform the base station that a second uplink transmission beam that may be used for uplink communication has better communication metrics than a first uplink transmission beam that may be used for uplink communication. As some examples, in some embodiments, such information may inform the base station: (1) that the power amplifiers associated with the second transmission beam generate more radio frequency (RF) power than the power amplifiers associated with the first transmission beam, (2) that the RF hardware associated with the second transmission beam consumes less power than the RF hardware associated with the first transmission beam, and/or (3) that the RF transmit power associated with the first transmission beam has to be limited in comparison to the RF transmit power associated with the second transmission beam because the first transmission beam is generated by an array of antennas that are close to a human body part.

According to some embodiments, the base station may process the indication of the one or more preferred transmission beams, the priority levels, and the quality metric. Based on processing of at least one of the indication of the one or more preferred transmission beams, the priority levels, or the quality metric, the base station may be configured to transmit, and the mobile device may be configured to receive, an indication of a transmission beam, selected from the one or more preferred transmission beams, to use for uplink wireless communication.

Accordingly, in some embodiments, the mobile device being configured to receive an indication of one or more transmission beams to use for uplink wireless communication based on the level of beamforming reciprocity, such as at block 404 illustrated in FIG. 4, may include the mobile device being configured to receive an indication of a transmission beam, selected from the one or more preferred transmission beams, to use for uplink wireless communication based on processing of at least one of: the indication of the one or more preferred transmission beams, the priority levels, or the quality metric. With reference to FIG. 2, in some embodiments, a means for receiving an indication of a transmission beam to use for uplink wireless communication in response to processing by a base station may include the UE 115, and more specifically the components of the UE 115, such as, for example, controller/processor 280 and components of the UE 115 that are controlled/directed by controller/processor 280 to cause the UE 115 to receive an indication of a transmission beam to use for uplink wireless communication in response to processing by a base station.

Similarly, in some embodiments, the base station being configured to transmit an indication of one or more transmission beams to use for uplink wireless communication based on the level of beamforming reciprocity may include the base station being configured to transmit an indication of a transmission beam, selected from the one or more preferred transmission beams, to use for uplink wireless communication based on processing of at least one of: the indication of the one or more preferred transmission beams, the priority levels, or the quality metric. With reference to FIG. 2, in some embodiments, a means for transmitting an indication of a transmission beam, selected from the one or more preferred transmission beams, to use for uplink wireless communication may include the base station 105, and more specifically the components of the base station 105, such as, for example, controller/processor 240 and components of the base station 105 that are controlled/directed by controller/processor 240 to cause the base station 105 to transmit an indication of a transmission beam, selected from the one or more preferred transmission beams, to use for uplink wireless communication.

Accordingly, in some embodiments, configuring the mobile device to transmit information using at least one of the one or more transmission beams, such as at block 406 illustrated in FIG. 4, may include configuring the mobile device to transmit information using the transmission beam selected from the one or more preferred transmission beams.

Similarly, configuring a base station to receive information that has been transmitted using at least one of the one or more transmission beams may include configuring the base station to receive information that has been transmitted using the transmission beam selected from the one or more preferred transmission beams. With reference to FIG. 2, in some embodiments, a means for transmitting information using the transmission beam selected from the one or more preferred transmission beams may include the UE 115, and more specifically the components of the UE 115, such as, for example, controller/processor 280 and components of the UE 115 that are controlled/directed by controller/processor 280 to cause the UE 115 to transmit information using the transmission beam selected from the one or more preferred transmission beams. Similarly, with reference to FIG. 2, in some embodiments, a means for receiving information that has been transmitted using the transmission beam selected from the one or more preferred transmission beams may include the base station 105, and more specifically the components of the base station 105, such as, for example, controller/processor 240 and components of the base station 105 that are controlled/directed by controller/processor 240 to cause the base station 105 to receive information that has been transmitted using the transmission beam selected from the one or more preferred transmission beams.

According to some embodiments, a mobile device lacking full beamforming reciprocity capabilities may determine a transmission beam to use for uplink communication without performing uplink beam training. Without uplink beam training, some mobile devices embodiments may not utilize previous information associated with the reception beam used for downlink communication that has been stored in the mobile device. For example, in some embodiments, when a mobile device uses a specific reception beam to perform downlink communication, e.g., as part of a downlink BPL, the mobile device may store information about that specific reception beam, such as directivity pattern properties associated with the specific reception beam. If the mobile device does not have full beamforming reciprocity capabilities, the mobile device may need to undergo uplink beam training with the base station to identify a transmission beam to use for uplink communication when the specific reception beam is used for downlink communication.

The mobile device may store the result of the uplink beam training so that the mobile device knows the transmission beam to be used for uplink communication when the specific reception beam is used for downlink communication. For example, the mobile device may store directivity pattern properties associated with the transmission beam identified through uplink beam training for use by the mobile device for uplink communication and may store information that associates that identified transmission beam with the specific reception beam used for downlink communication. In some embodiments, when the mobile device subsequently uses the specific reception beam to perform downlink communication, the mobile device may know the transmission beam to be used for uplink communication from the information it stored in the mobile device, such as the information that previously associated the transmission beam identified during a previously-performed uplink beam training session with the specific reception beam and the directivity pattern properties of the previously-identified transmission beam.

Figure 7:
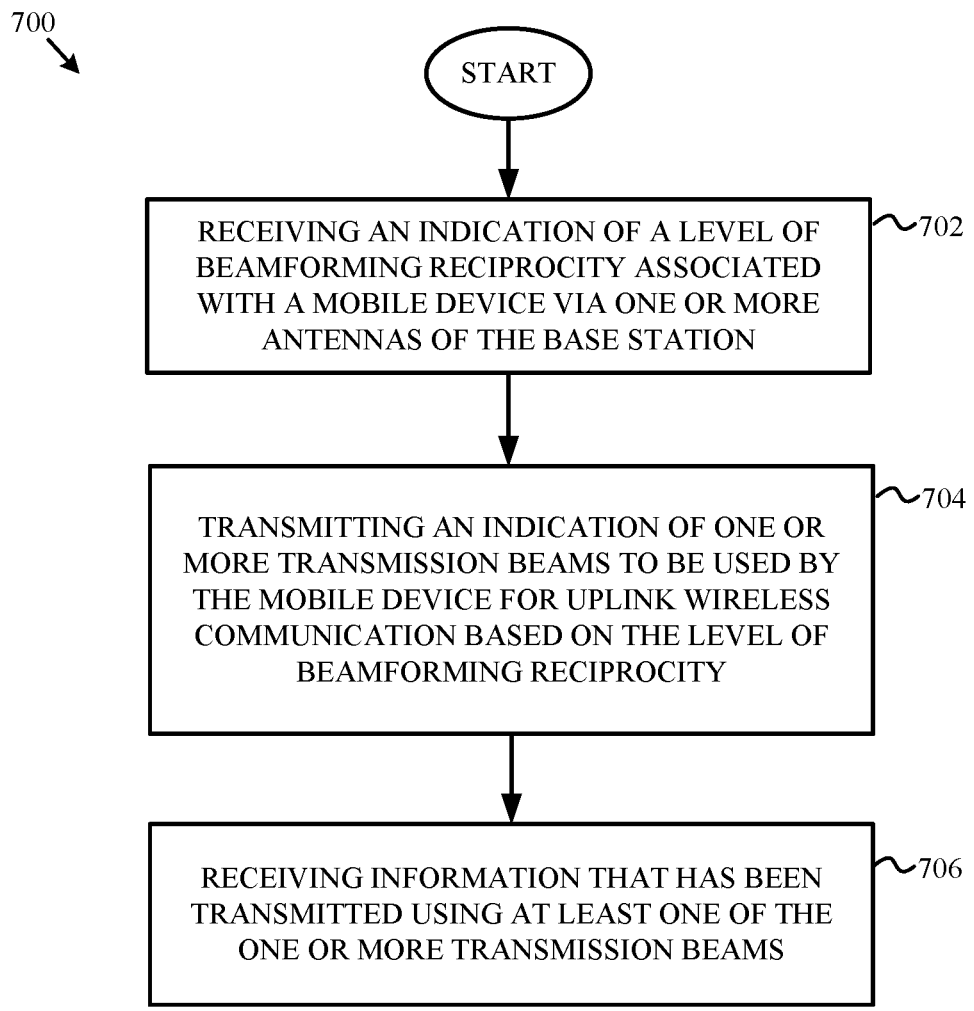
FIG. 7 is a block diagram illustrating a method for identifying beams for use in uplink wireless communication according to some embodiments of the present disclosure.

FIG. 7 is a block diagram illustrating a method for identifying beams for use in uplink wireless communication according to some embodiments of the present disclosure. Aspects of method 700 may be implemented with the aspects of this disclosure described with respect to FIGS. 1-3 and 5-6. For example, with reference to FIG. 2, controller/processor 240 of gNB 105 may control gNB 105 to perform the steps of method 700. Specifically, method 700 includes, at block 702, the step of receiving, by a processor of the base station, an indication of a level of beamforming reciprocity associated with a mobile device via one or more antennas of the base station. With reference to FIG. 2, in some embodiments, a means for receiving an indication of a level of beamforming reciprocity associated with a mobile device may include the base station 105, and more specifically the components of the base station 105, such as, for example, controller/processor 240 and components of the base station 105 that are controlled/directed by controller/processor 240 to cause the base station 105 to receive an indication of a level of beamforming reciprocity associated with a mobile device.

At block 704, method 700 includes the step of transmitting, by the processor via one or more antennas of the base station, an indication of one or more transmission beams to be used by the mobile device for uplink wireless communication based on the level of beamforming reciprocity. With reference to FIG. 2, in some embodiments, a means for transmitting an indication of one or more transmission beams to be used by the mobile device for uplink wireless communication based on the level of beamforming reciprocity may include the base station 105, and more specifically the components of the base station 105, such as, for example, controller/processor 240 and components of the base station 105 that are controlled/directed by controller/processor 240 to cause the base station 105 to transmit an indication of one or more transmission beams to be used by the mobile device for uplink wireless communication based on the level of beamforming reciprocity.

At block 706, method 700 includes the step of receiving, by the processor via one or more antennas of the base station, information that has been transmitted using at least one of the one or more transmission beams. With reference to FIG. 2, in some embodiments, a means for receiving information that has been transmitted using at least one of the one or more transmission beams may include the base station 105, and more specifically the components of the base station 105, such as, for example, controller/processor 240 and components of the base station 105 that are controlled/directed by controller/processor 240 to cause the base station 105 to receive information that has been transmitted using at least one of the one or more transmission beams.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein. For example, other methods of the disclosure may include only portions of the method steps disclosed in FIGS. 4 and 7, may include a combination of the method steps disclosed in FIGS. 4 and 7, or may include all or none of the method steps disclosed in FIGS. 4 and 7. Therefore, other methods of the disclosure may not include all the details illustrated in FIGS. 4 and 7.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

As used herein, including in the claims, a transmission (or reception) beam having directivity pattern properties that are "approximately reciprocal" to a reception (or transmission) beam means that the transmission beam has a beamforming direction that is equal to, or approximately equal to, the beamforming direction of the reception beam. As one numeric example (and not limitation), in one embodiment, a transmission beam of a mobile device (or base station) that is within 5° of a reception beam of the mobile device (or base station) may be considered to be an "approximately reciprocal" transmission beam of that reception beam. As another numeric example (and not limitation), in one embodiment, a transmission beam of a mobile device (or base station) that is within 10° of a reception beam of the mobile device (or base station) may be considered to be an "approximately reciprocal" transmission beam of that reception beam. As an illustrative example (and not limitation), in FIG. 3, because the transmission beam 321 of base station 302 used for downlink communication with mobile device 304 is in the same beamforming direction 314 as the reception beam 321 of base station 302 used for uplink communication with mobile device 304, the beams 321 used by the base station 302 for downlink and uplink communication may be considered "approximately reciprocal" beams. By contrast, transmission beam 331 would not be considered "approximately reciprocal" to reception beam 321.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving an indication of beamforming reciprocity associated with a mobile device;
transmitting an instruction to perform uplink beam training based on the beamforming reciprocity indication;
receiving information that has been transmitted using a plurality of candidate transmission beams in response to the transmission of the instruction to perform uplink beam training;
transmitting an indication of at least one of the plurality of candidate transmission beams to use for uplink wireless communication based on processing of the received information that was transmitted using the plurality of candidate transmission beams
receiving information that has been transmitted using the at least one of the plurality of candidate transmission beams.

2. The method of claim 1, wherein the beamforming reciprocity indication indicates at least one of full reciprocity, partial reciprocity, no reciprocity, or an estimate of a number of transmission beams to be used for uplink beam training.

3. The method of claim 1, further comprising:
transmitting, along with the instruction to perform uplink beam training, at least one of:
an indication of a number of transmission beams to be used for uplink beam training, wherein a number of transmission beams in the plurality of candidate transmission beams corresponds to the transmitted indication of the number of transmission beams to be used for uplink beam training; or
directivity pattern properties associated with a reception beam used for downlink wireless communication, wherein at least one of the plurality of candidate transmission beams includes directivity pattern properties that are approximately reciprocal to the transmitted directivity pattern properties associated with the reception beam used for downlink wireless communication.

4. The method of claim 1, further comprising:
receiving directivity pattern properties associated with a proposed transmission beam for uplink wireless communication;
receiving quality information associated with uplink wireless communication performed using the proposed transmission beam;

receiving a quality-improvement estimate that provides an indication of achievable improvement in the quality of uplink wireless communication through uplink beam training;

transmitting an instruction to use the proposed transmission beam for uplink wireless communication based on processing of the quality information and quality-improvement estimate; and receiving information that has been transmitted using the proposed transmission beam for uplink wireless communication.

5. The method of claim 1, further comprising:

transmitting, when the beamforming reciprocity indication indicates full reciprocity, an instruction to use a reciprocal transmission beam, for uplink wireless communication, that has directivity pattern properties that are reciprocal directivity pattern properties of directivity pattern properties of a reception beam used for downlink wireless communication; and receiving information that has been transmitted using the reciprocal transmission beam.

6. An apparatus configured for wireless communication, comprising:

means for receiving an indication of beamforming reciprocity associated with a mobile device;

means for transmitting an instruction to perform uplink beam training based on the beamforming reciprocity indication;

means for receiving information that has been transmitted using a plurality of candidate transmission beams in response to the transmission of the instruction to perform uplink beam training;

means for transmitting an indication of at least one of the plurality of candidate transmission beams to use for uplink wireless communication based on processing of the received information that was transmitted using the plurality of candidate transmission beams; and means for receiving information that has been transmitted using the at least one of the plurality of candidate transmission beams.

7. The apparatus of claim 6, wherein the beamforming reciprocity indication indicates at least one of full reciprocity, partial reciprocity, no reciprocity, or an estimate of a number of transmission beams to be used for uplink beam training.

8. The apparatus of claim 6, further comprising:

means for transmitting, along with the instruction to perform uplink beam training, at least one of:

an indication of a number of transmission beams to be used for uplink beam training, wherein a number of transmission beams in the plurality of candidate transmission beams corresponds to the transmitted indication of the number of transmission beams to be used for uplink beam training; or directivity pattern properties associated with a reception beam used for downlink wireless communication, wherein at least one of the plurality of candidate transmission beams includes directivity pattern properties that are approximately reciprocal to the transmitted directivity pattern properties associated with the reception beam used for downlink wireless communication.

9. The apparatus of claim 6, further comprising:

means for receiving directivity pattern properties associated with a proposed transmission beam for uplink wireless communication;

means for receiving quality information associated with uplink wireless communication performed using the proposed transmission beam;

means for receiving a quality-improvement estimate that provides an indication of achievable improvement in the quality of uplink wireless communication through uplink beam training;

means for transmitting an instruction to use the proposed transmission beam for uplink wireless communication based on processing of the quality information and quality-improvement estimate; and means for receiving information that has been transmitted using the proposed transmission beam for uplink wireless communication.

10. The apparatus of claim 6, further comprising:

means for transmitting, when the beamforming reciprocity indication indicates full reciprocity, an instruction to use a reciprocal transmission beam, for uplink wireless communication, that has directivity pattern properties that are reciprocal directivity pattern properties of directivity pattern properties of a reception beam used for downlink wireless communication; and means for receiving information that has been transmitted using the reciprocal transmission beam.

11. A non-transitory computer-readable medium having program code recorded thereon, the program code comprising:

program code executable by a computer for causing the computer to receive an indication of beamforming reciprocity associated with a mobile device;

program code executable by the computer for causing the computer to transmit an instruction to perform uplink beam training based on the beamforming reciprocity indication;

program code executable by the computer for causing the computer to receive information that has been transmitted using a plurality of candidate transmission beams in response to the transmission of the instruction to perform uplink beam training;

program code executable by the computer for causing the computer to transmit an indication of at least one of the plurality of candidate transmission beams to use for uplink wireless communication based on processing of the received information that was transmitted using the plurality of candidate transmission beams; and program code executable by the computer for causing the computer to receive information that has been transmitted using the at least one of the plurality of candidate transmission beams.

12. The non-transitory computer-readable medium of claim 11, wherein the beamforming reciprocity indication indicates at least one of full reciprocity, partial reciprocity, no reciprocity, or an estimate of a number of transmission beams to be used for uplink beam training.

13. The non-transitory computer-readable medium of claim 11, further comprising:

program code executable by a computer for causing the computer to transmit, along with the instruction to perform uplink beam training, at least one of:

an indication of a number of transmission beams to be used for uplink beam training, wherein a number of transmission beams in the plurality of candidate transmission beams corresponds to the transmitted indication of the number of transmission beams to be used for uplink beam training; or directivity pattern properties associated with a reception beam used for downlink wireless communication, wherein at least one of the plurality of candidate transmission beams includes directivity pattern properties that are approximately reciprocal to the transmitted directivity pattern properties associated with the reception beam used for downlink wireless communication.

14. The non-transitory computer-readable medium of claim 11, further comprising:
   program code executable by a computer for causing the computer to receive directivity pattern properties associated with a proposed transmission beam for uplink wireless communication;
   program code executable by a computer for causing the computer to receive quality information associated with uplink wireless communication performed using the proposed transmission beam;
   program code executable by a computer for causing the computer to receive a quality-improvement estimate that provides an indication of achievable improvement in the quality of uplink wireless communication through uplink beam training;
   program code executable by a computer for causing the computer to transmit an instruction to use the proposed transmission beam for uplink wireless communication based on processing of the quality information and quality-improvement estimate; and
   program code executable by a computer for causing the computer to receive information that has been transmitted using the proposed transmission beam for uplink wireless communication.

15. The non-transitory computer-readable medium of claim 11, further comprising:
   program code executable by a computer for causing the computer to transmit, when the beamforming reciprocity indication indicates full reciprocity, an instruction to use a reciprocal transmission beam, for uplink wireless communication, that has directivity pattern properties that are reciprocal directivity pattern properties of directivity pattern properties of a reception beam used for downlink wireless communication; and
   program code executable by a computer for causing the computer to receive information that has been transmitted using the reciprocal transmission beam.

16. An apparatus configured for wireless communication, the apparatus comprising:
   at least one processor; and
   a memory coupled to the at least one processor,
   wherein the at least one processor is configured to:
      receive an indication of beamforming reciprocity associated with a mobile device;
      transmit an instruction to perform uplink beam training based on the beamforming reciprocity indication;
      receive information that has been transmitted using a plurality of candidate transmission beams in response to the transmission of the instruction to perform uplink beam training;
      transmit an indication of at least one of the plurality of candidate transmission beams to use for uplink wireless communication based on processing of the received information that was transmitted using the plurality of candidate transmission beams; and
      receive information that has been transmitted using the at least one of the plurality of candidate transmission beams.

17. The apparatus of claim 16, wherein the beamforming reciprocity indication indicates at least one of full reciprocity, partial reciprocity, no reciprocity, or an estimate of a number of transmission beams to be used for uplink beam training.

18. The apparatus of claim 16, wherein the at least one processor is further configured to:
   transmit, along with the instruction to perform uplink beam training, at least one of:
      an indication of a number of transmission beams to be used for uplink beam training, wherein a number of transmission beams in the plurality of candidate transmission beams corresponds to the transmitted indication of the number of transmission beams to be used for uplink beam training; or
      directivity pattern properties associated with a reception beam used for downlink wireless communication, wherein at least one of the plurality of candidate transmission beams includes directivity pattern properties that are approximately reciprocal to the transmitted directivity pattern properties associated with the reception beam used for downlink wireless communication.

19. The apparatus of claim 16, wherein the at least one processor is further configured to:
   receive directivity pattern properties associated with a proposed transmission beam for uplink wireless communication;
   receive quality information associated with uplink wireless communication performed using the proposed transmission beam;
   receive a quality-improvement estimate that provides an indication of achievable improvement in the quality of uplink wireless communication through uplink beam training;
   transmit an instruction to use the proposed transmission beam for uplink wireless communication based on processing of the quality information and quality-improvement estimate; and
   receive information that has been transmitted using the proposed transmission beam for uplink wireless communication.

20. The apparatus of claim 16, wherein the at least one processor is further configured to:
   transmit, when the beamforming reciprocity indication indicates full reciprocity, an instruction to use a reciprocal transmission beam, for uplink wireless communication, that has directivity pattern properties that are reciprocal directivity pattern properties of directivity pattern properties of a reception beam used for downlink wireless communication; and
   receive information that has been transmitted using the reciprocal transmission beam.

* * * * *